Oct. 7, 1924.
W. E. WILSON
1,510,531
HEATER FOR AUTOMOBILE RADIATORS AND ENGINES
Filed April 17, 1922    2 Sheets-Sheet 2
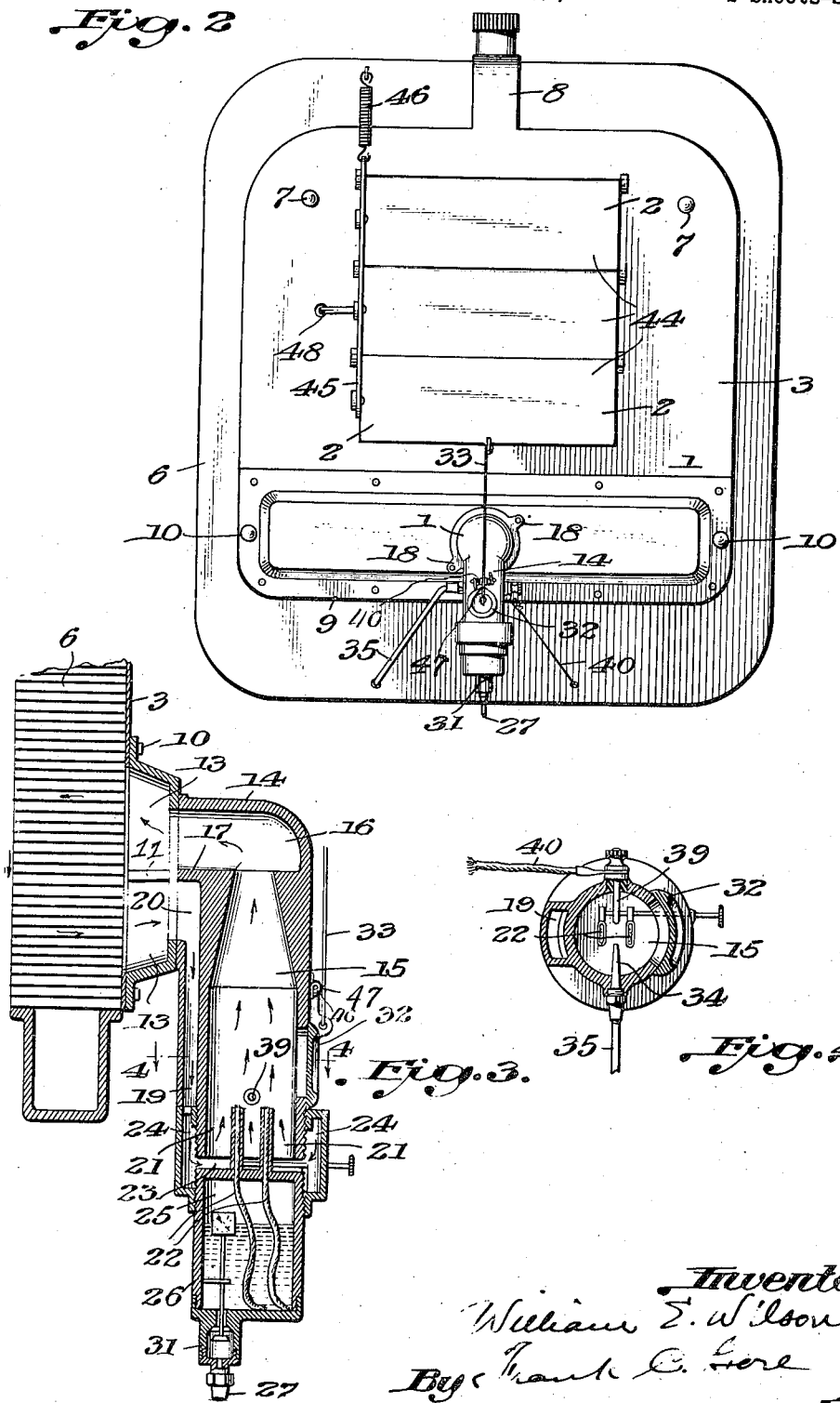

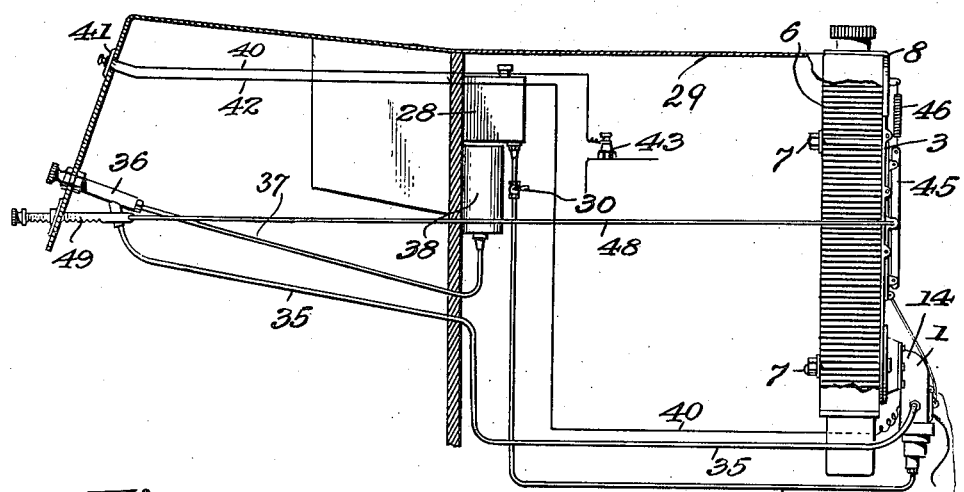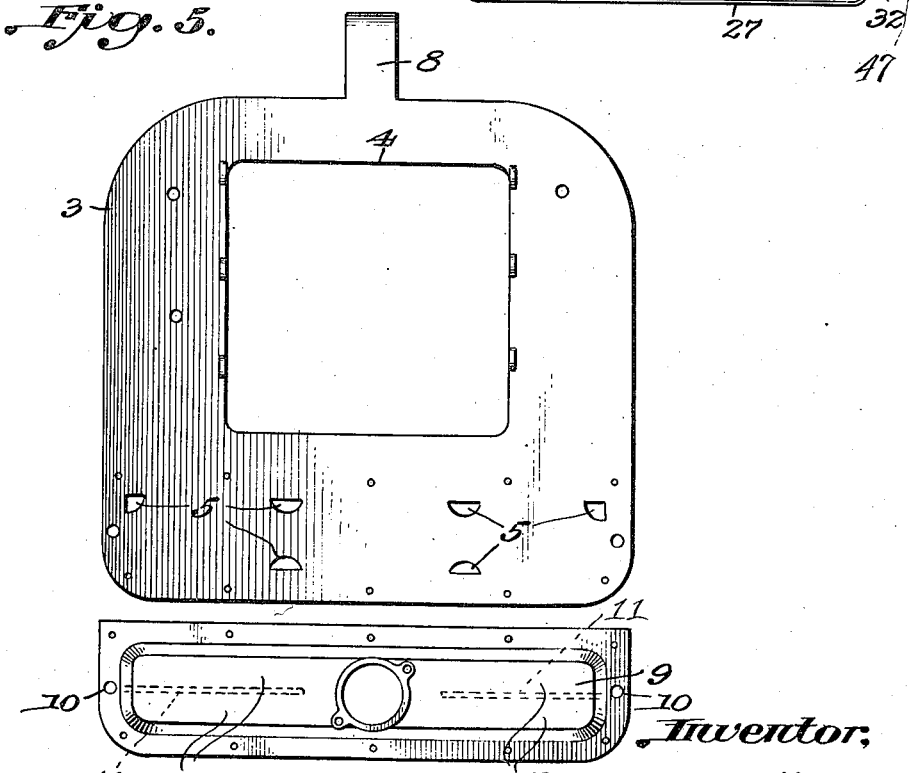

Patented Oct. 7, 1924.

1,510,531

UNITED STATES PATENT OFFICE.

WILLIAM E. WILSON, OF EVANSVILLE, INDIANA.

HEATER FOR AUTOMOBILE RADIATORS AND ENGINES.

Application filed April 17, 1922. Serial No. 554,351.

*To all whom it may concern:*

Be it known that I, WILLIAM E. WILSON, a citizen of the United States, residing at Evansville, in the county of Vanderburg and State of Indiana, have invented certain new and useful Improvements in Heaters for Automobile Radiators and Engines, of which the following is a specification.

This invention relates to heaters for automobile radiators and engines and it has for its object, generally stated, the provision of a novel device which may be attached to the radiator of any automobile or truck and will be adapted for directing heated air through the radiator to adequately heat the radiator and engine whenever desired and will be subject to operation under control at points adjacent the driver's seat as, for instance, the instrument board.

Another general object of the invention is to provide a combined shutter ventilator and radiator heater such as set forth which are arranged in unitary fashion so that they may be applied to, or removed from, the radiator as a unit and wherein there is a damper control for the heater cooperating with the shutters of the ventilator.

Unlike those radiator heaters which are adapted for temporary positioning in relation to the radiator of an automobile or truck, my heater and ventilator are adapted to be attached to the radiator and to remain thereon during those seasons of the year when a device of this character becomes necessary. During warm seasons, the radiator heater and ventilator are bodily removed from the radiator, it being then only necessary to disconnect and seal such "lines" of the car as are used in the operation of the heater and ventilator.

The heater is of novel construction in various respects mentioned, the novel features being the arrangement of the wicks in relation to the air return circuit whereby the same air is used over and over for supporting combustion; the construction of the heater shell by which the heated air is made to pass through the radiator and then to return backwardly therethrough so that it will assist in supporting combustion at the wicks; the damper or port control for the combustion chamber of the heater; and the automatic control of the illuminating fluid to the reservoir or fount of the heater.

The novel features having to do with the ignition of the wicks for the heater embody means for introducing a priming gasoline spray and the production of a spark adjacent the wicks, both the sparking and priming arrangements being under control of means located at points adjacent the driver as, for instance, on the instrument board, so that when the car is brought to a stop in cold weather and requires the operation of the heater to keep the radiator and engine properly warmed so that starting may be quickly had when desired, such institution of combustion may be accomplished from the driver's seat.

The control of the ventilating shutters is accomplished from means located adjacent the driver as, for instance, on the instrument board. In that connection, the invention preferably embodies the combination with the shutters of spring means for automatically opening them when the controlling means on the instrument board is properly manipulated.

The heater is provided with a shutter or damper cooperating with the ventilating shutters so that when the latter are closed, the damper is closed, and when the shutters are opened, the damper is opened extinguishing the wicks so that the heater ceases to heat the radiator.

A kerosene tank is preferably employed for supplying the fount of the heater. The pipe line from the kerosene tank to the fount may have a controlling valve alone, or an automatic feed controller, or both.

The gasoline priming pipe line which sprays gasoline adjacent the wicks for purposes of creating an ignitible vapor, leads from the vacuum tank to a priming device on the instrument board and thence to the heater.

A switch on the instrument board is in circuit with a spark plug on the engine and a spark post so located adjacent the gasoline spray that when the switch is closed the high tension circuit will cause a spark to jump adjacent the wicks and ignite the priming spray and start the wicks burning.

I am aware that my invention is susceptible of modification in various aspects without departing from its essential principles and I wish it understood, therefore, that the description and disclosure in the drawings is illustrative, and not restrictive, of the scope of the invention as modifications may be resorted to.

In the accompanying drawings:

Figure 1 is a part sectional, part side elevation showing my improvements applied to an automobile.

Fig. 2 is a front elevation of an automobile radiator, showing my improvements applied thereto.

Fig. 3 is a vertical section through the heater, showing it applied to the lower part of the radiator.

Fig. 4 is a cross section on line 4—4, Fig. 3.

Fig. 5 is a front elevation of the base or plate to which the shutters and the heater are connected; and Fig. 6 is a front elevation of the casting or delivery mouth for attaching the heater to the base plate.

The heater 1 and shutters 2 are suitably connected to a stiff sheet metal plate 3 which completely covers the radiator and is provided with an opening 4 located under the shutters and has a number of openings 5 through which the heat can pass from the heater 1 to the radiator 6 when the device is attached to said radiator. The plate 3 is connected to the radiator 6 by any suitable means such, for instance, as bolts 7, and it is also suspended from the filling nipple for the radiator by an angle hanger 8.

As thus attached, the heater 1 and shutters 2 are bodily carried by the radiator and are intended to remain connected to it during those seasons of the year when the use of a heater and a limited amount of ventilation is desirable. When the weather becomes suitably warm, the bolts 7 and the hanger 8 are detached and the plate 3, with the heater 1 and shutters 2 attached, is removed and suitably stored until again needed. The various connections and feed lines, hereinafter described, are closed and the car then appears as usual.

The heater 1 has an elongated delivery mouth 9 which is suitably connected to plate 3 at 10 and is provided with horizontal partitions 11, which subdivide its interior into compartments 13, the upper ones of which are adapted to receive the hot air coming from the heater and to direct it to the radiator 6, and under the hood 29 whereas the lower compartments receive the cold air accumulating under the hood 29 and return this air to the heater by way of diving flue 19 hereinafter described.

The heater body 14 is of general tubular shape, being provided with a combustion chamber 15, and has a distributing chamber 16 which communicates with the upper chambers 13. The heater body 14 is suitably flanged and connected to the mouth 9 at 18. The heater has a diving flue 19 whose mouth 20 is located opposite the lower chambers 13 so as to receive the returning air after it has passed outwardly through the radiator 6. This diving flue directs the air to an annular flue 21 surrounding the wicks 22, through an annular port 23 which delivers the air into the chamber 24 in which the wick holders and wicks extend upwardly. The wicks 22 receive fuel from the reservoir or fount 25 inside the cup 26 at the bottom of the heater 1. The reservoir or fount 25 is fed by a small pipe 27 from a suitable tank 28 mounted at any convenient point under the hood 29 of the automobile. The pipe line 27 is provided with any suitable valve 30 which may be a pet cock, or otherwise, by which the flow through the fount 25 may be controlled, or the feed shown. Kerosene is preferably employed as the fuel in the tank 28 and reservoir 25.

A float control automatic admission and cut off valve 31 is preferably employed to regulate the admission of the fuel into the fount 25 so that when the kerosene or other fuel is lowered in said fount, an additional volume will be allowed to enter in order that the fount may be properly supplied at all times. The tank 28 is provided with a suitable filling opening and conveniently arranged.

There is provided a hinged damper 32 on the body 14 which is controlled from the shutters 2 by a flexible connection 33, as hereinafter described, so that when the shutters are closed the damper 32 will be closed and when the shutter 2 is open the damper 32 will be open, thus allowing the admission of air to the combustion chamber 15 and extinguishing the wicks.

To enable the driver to light the wicks 22 without leaving his seat, there is provided a high tension ignition and priming arrangement. A priming nozzle 34 extends through the side of the heater and has its tip located between the upper ends of the wicks 22 and is fed by a small pipe 35 which leads to a priming device 36 of an ordinary type located on the instrument board or conveniently to the driver's seat, said priming device 36 being connected by pipe 37 to a suitable source of gasoline supply, for instance, the usual vacuum tank 38.

A high tension terminal 39 is carried by the heater with its tip adjacent the tip of the nozzle 34 and is connected by a high tension wire 40 to a suitable spark switch 41 on the instrument board, said switch being in circuit 42 with one of the spark plugs 43 of the engine.

By operating the primer 36 and then the switch 41, ignition of the wicks 22 is readily accomplished.

While I have described the use of oil and wicks for supplying heat, and the employment of ignitible priming means for said heater and lay claim to these constructions, features and combinations, nevertheless, in so far as the heater and its construction and manner of delivery of the air to the radiator and the return of the air to the heater are concerned, it is to be understood that other means for supplying heat, such as gas, electrical heating means, etc., may be used.

The shutter 2 comprises a plurality of hinged leaves 44 connected by a bar 45, pivoted thereto, and adapted to automatically open, when released by the action of a coil spring 46. Damper 32 is normally closed by a spring located at 47. When the shutter leaves 44 open by the action of spring 46 the connection 33 permits the damper 32 to be opened by the spring 46. Consequently if the heater is burning and the shutters are open, the damper 32 will be opened and the wicks will be extinguished. Obviously when it is desired to ventilate or cool the radiator, the shutters 44 should be opened. However, the invention is not limited to the cooperation of these parts as just described.

Any suitable means may be employed for holding the shutter leaves 44 in closed position and also closing damper 32 and to release them so that the spring 46 will open when desired. One such means comprises a pull wire 48 leading to a knob and ratchet 49 on the instrument board. Where the pull wire passes through the radiator a hollow tube is used in order to protect the honeycomb.

*Operation.*—When the car is brought to a stop and it is desired to have the heater operate, the device 49 is pulled to close the shutter leaves 44, in doing which the connection 33 is slackened and allows the damper 32 to be closed by the action of its spring 47. The primer 36 is now operated to inject a fine spray of gasoline between the wicks 22 and the switch 41 is operated to cause a spark to pass from the terminal 39 to the tube 34. This action results in ignition of the gasoline and ignition of the wicks 22, whereupon the wicks, being supplied by the oil in the reservoir 25, heat the air flowing from under hood 29 into the combustion chamber 15 by way of the radiator, mouth 20 and flue 19. The heated air passes into the chamber 16 and thence above the horizontal partition 11 thus distributing the heated air through the radiator 6. Air from under hood 29 passes into the lower chambers 13 and thence dives down the flue 19, passing through the port 23 into the wick chamber 24. Advantage is thus taken of the heat radiated from chamber 15 to raise the temperature of the air passing down flue 19.

When the car is to be started, the driver releases the device 49, whereupon the spring 46 opens the shutter leaves 44, and by the connection 33 allows the spring 47 to open the damper 32. The supply of outside air to the combustion chamber 15 being thereby allowed to enter at 32, the flame at the wicks is extinguished and the heating operation ceases. Ventilation for the radiator and engine is then provided by reason of the shutter leaves being open and they can be set as desired to afford the proper inflow of cold air while the car is in motion.

I prefer to provide an asbestos coating or lining for the hood 29 to retain the heat and minimize penetration of cold air through the hood. Also to provide felt linings for the shutters and base plate to prevent rubbing.

With my invention, at small expense, the engine is kept sufficiently warm while the car is standing stationary to enable immediate starting to be had without resort to well known and annoying means for priming and warming the engine. My invention also dispenses with the necessity for covering the hood or using permanent covers, it saves the life of the battery, and minimizes wear and tear on the electrical system and starter equipment, and does away entirely with various troubles well known to motorists due to a cold engine in cold weather.

I claim:

1. A heater and ventilator for automobiles comprising a base adapted for attachment to the automobile radiator, a heater connected to and carried by said base, an independent ventilator connected to and carried by the base, said base, heater, and ventilator comprising a unitary attachment adapted for connection to, or removal from, the radiator, and means operated by the ventilator for controlling the heater.

2. The combination with a heater for an automobile radiator, of a ventilator for said radiator, means for controlling the heater, and an operative connection between said means and the ventilator.

3. The combination with a heater for an automobile radiator, of an automatically opening ventilator for said radiator, means for closing the ventilator, a damper for controlling the heater, and an operative connection between the damper and the ventilator.

4. The combination with a heater for an automobile radiator, of an automatically opening ventilator for said radiator, means for closing the ventilator, a spring operated damper for the heater and an operative connection between the damper and the ventilator, whereby on the closing of the ventilator, the damper will close, and vice versa.

5. A heater for automobile radiators comprising a body having a combustion chamber provided with means for delivering the heated air from the combustion chamber to the radiator and with an air conduit arranged adjacent the heater for the transmission of heat thereto from the heater by which pre-heated air is furnished to said chamber.

6. A heater for automobile radiators comprising a body having a combustion chamber provided with a combined heated air delivery and air return mouth by which the heated air from the combustion chamber is made to travel to the radiator and by which additional air is admitted to said heater after being pre-heated by said heater.

In testimony whereof I affix my signature.

WILLIAM E. WILSON.